United States Patent [19]
Firehammer et al.

[11] 3,983,364
[45] Sept. 28, 1976

[54] APPARATUS UTILIZING ANALOG-TO-DIGITAL CONVERSION IN THE PHOTOELECTRIC READING OF DOCUMENTS

[75] Inventors: John D. Firehammer, Burnsville; Dale W. Gruebele, Bloomington, both of Minn.

[73] Assignee: National Computer Systems, Inc., Minn.

[22] Filed: July 3, 1972

[21] Appl. No.: 268,445

[52] U.S. Cl. .............................. 235/61.6 E; 35/48 B; 235/61.11 E
[51] Int. Cl.[2] .......................................... G06K 5/00
[58] Field of Search ................. 235/61.6 E, 61.11 E, 235/61.11 R, 61.6 A; 35/48 B, 48 R; 328/151; 178/DIG. 3; 179/15.55 R, 15 A, 15 R, 15 AP; 340/347 SH, 146.3 AC

[56] References Cited
UNITED STATES PATENTS

| | | | |
|---|---|---|---|
| 2,937,369 | 5/1960 | Newbold et al. | 340/347 SH |
| 2,978,535 | 4/1961 | Brown | 179/15.55 R |
| 3,059,228 | 10/1962 | Beck et al. | 340/347 SY |
| 3,201,569 | 8/1965 | Conron | 235/61.7 R |
| 3,363,113 | 1/1968 | Bedingfield | 328/151 X |
| 3,487,560 | 1/1970 | Hassfurther et al. | 35/48 B |
| 3,495,235 | 2/1970 | Ottesen | 340/347 AD |
| 3,524,048 | 8/1970 | McMillin | 235/61.11 E |
| 3,536,895 | 10/1970 | Dedden et al. | 235/61.6 A |
| 3,603,975 | 9/1971 | Gordon | 340/347 AD |
| 3,629,496 | 12/1971 | McConnell | 178/DIG. 3 |
| 3,692,982 | 9/1972 | McMillin | 235/61.11 E |
| 3,718,910 | 2/1973 | Scray et al. | 328/151 |
| 3,737,628 | 6/1973 | Azure | 35/48 B |

*Primary Examiner*—Thomas J. Sloyan
*Attorney, Agent, or Firm*—Stuart R. Peterson

[57] ABSTRACT

An examination answer sheet, on which the examinee has darkened certain discrete areas with a graphite or lead pencil to denote his selected answers to multiple choice questions, is moved relative to a plurality of photoelectric cells, these cells providing analog voltages having magnitudes in accordance with the opacity of the marks or data on the sheet. During time intervals derived photoelectrically from a sequence of marks constituting a timing track, the highest voltages provided by the data cells are individually stored, later digitized, and the digital information forwarded to a computer for comparative processing with answer information contained in the computer's memory.

14 Claims, 4 Drawing Figures

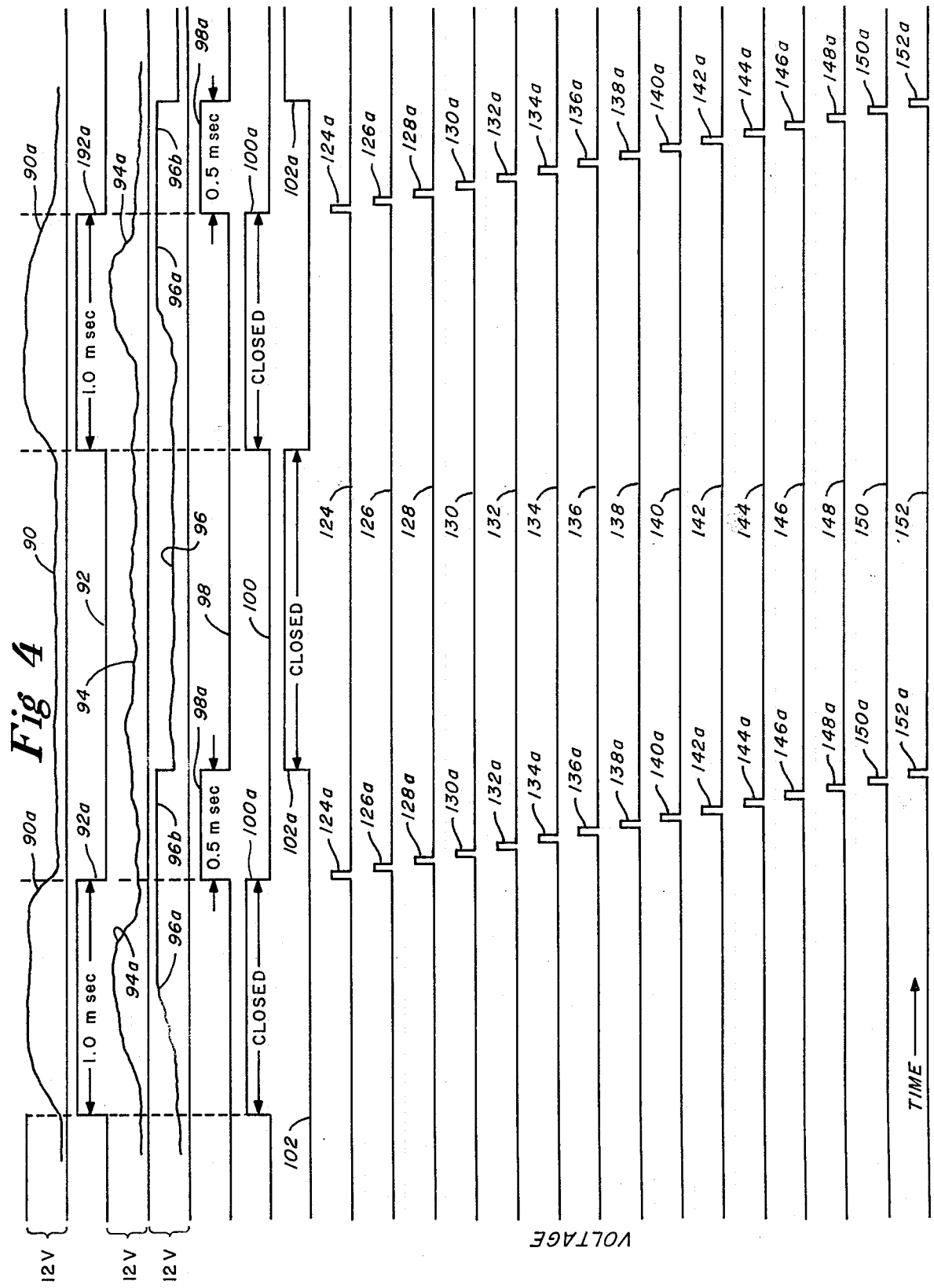

APPARATUS UTILIZING ANALOG-TO-DIGITAL CONVERSION IN THE PHOTOELECTRIC READING OF DOCUMENTS

BACKGROUND OF THE INVENTION

1. Field of the Invention

This invention relates generally to document reading in which it is desired to determine the presence or absence of a mark which is indicative of certain coded information, and pertains more especially to apparatus for discriminating between intended marks representing selected answers or other coded information contained on the document as contrasted with unintended ones that have been incompletely or inadequately erased.

2. Description of the Prior Art

Examination answer sheets of the envisaged types are now rather widely used and need not be described in any great detail. However, it should be borne in mind that discrete areas are provided on a translucent sheet of paper. The answer sheet, quite obviously, is designed for a given type of examination and the questions are multiple choice questions, sometimes being true or false and at other times requiring the selection of one or more answers where a number of possible answers can be chosen. Frequently, however, the examinee changes his mind after marking a particular area with a lead pencil, attempts to erase the mark, but does so in a manner such that the mark is still discernible by conventional grading apparatus. Consequently, correct answers can go undetected by the usual type of photoelectric scoring apparatus, or an answer may be ruled out by the machine because it senses two responses which calls for a disqualification of that particular answer.

One prior art method that has been commonly employed involves the use of a two-threshold techniques for determining the presence of a mark. The lowest threshold voltage is used to indicate whether there is a mark (light or dark or even possibly an erasure). The higher threshhold voltage is then used to indicate whether the mark is a dark mark and not an erasure or light mark. Thus, when utilizing the two-threshold method alluded to above, there can be only three parameters obtained for a mark: (1) a parameter indicating that there is no mark, (2) that there is a light mark, or (3) that there is a dark mark.

For instance, if on an answer sheet having a grid of five responses, there is an erasure on one so-called "bubble" or response area and a light mark in another bubble or response area, the result would be that the apparatus would indicate that there is no mark in either one of these bubbles or areas, that a light mark exists in both of them, or the grading machine would come up with the result that there is no mark in one instance and a light mark in the other. Accordingly, with this particular prior art method, whenever there would be an erasure and a light mark within the grid of five the machine could signify that there is a light mark in both bubbles or response areas and the sheet would be diverted into a rejected pile for manual editing. Such a system has resulted in a fairly high percentage of sheets that have to be edited by hand, this being approximately 5%. Not only does this particular prior art method entail greater manual editing, but if a change in the threshold level at which the equipment is to start picking up or responding to lighter or less opaque marks, the change had to be accomplished by manually adjusting or "tweeking" the potentiometer for each photoelectric cell, this being quite time-consuming.

The other commonly used method with which we are familiar has been called the darkest mark approach, this being where the circuitry acts to take off or pick-up the highest voltage value seen as far as a particular bubble or response area is concerned in the grid being sensed. As pointed out above, a grid usually comprises five response areas, but this number can be varied, a grid of only two being involved in the case of true and false questions. In such a system, there is a salient disadvantage stemming from the fact that there is little edit capability. Should an erasure appear as a mark slightly darker or more dense than a light mark, the equipment under these circumstances will pick the erasure instead of a true answer. Stated somewhat differently, the examinee in such a situation erases a mark and then, to avoid penalty for an incorrect answer, he does not darken another area in substitution for the bubble he has erased. Unfortunately, with this type of prior art machine, he ends up being penalized anyway.

SUMMARY OF THE INVENTION

Accordingly, one general object of the present invention is to provide apparatus for photoelectrically reading documents in which a more accurate or precise indication is provided with respect to the various marks constituting the data. As far as examination answer sheets are concerned, the invention enables the grading equipment to determine more accurately which is the intended mark. More specifically, an aim of the invention is to discriminate between marks having various degrees of opacity. Consequently, it is within the purview of the present invention to provide a greater amount of inherent edit capability in the apparatus itself as far as grading answer sheets is concerned, thereby virtually eliminating the need for manual editing.

Another object of the invention is to greatly facilitate changing the threshold level at which light marks on a document are to be considered. In this regard, it is planned that the sensed data, after conversion to digital information, is delivered to a computer and that only a parameter be changed within the computer, a simple programming feat. In other words, the computer can be readjusted internally, and there is no need to make the various potentiometer adjustments heretofore required as far as the prior art is concerned, a task that have proved so time-consuming in the past.

Yet another object is to provide apparatus that will discriminate accurately between various types of marks as far as their opacities are concerned, and which will not require a large amount of additional hardware in doing so. For example, assuming that there are 60 photoelectric cells that read the data on the document, it is planned that only four analog-to-digital converters be employed, the analog voltages derived from the 60 cells all being stored and then, through the agency of multiplexing, the four converters are used in a sequential fashion to transform the analog information that has been stored into appropriate digital representations which are forwarded to the computer on a time-shared basis.

Another object of our invention is to provide a system that is completely compatible with those answer sheets having discrete areas representative of paritcular answers or information that are located virtually any place on the document; the orientation thereof or relationship with respect to each other is unimportant to a practicing of our invention. Hence, the advantages of using a general purpose computer, particularly in the case of programming, to take care of the lack of any physical relationship between response areas or bubbles are retained. In other words, the programmed computer deciphers the stored information, taking what it has been instructed to take and disregarding that which it has not been instructed to accept. Yet, the present invention enables the computer to do this on a highly discriminatory basis, thereby rendering the reading or documents, the grading of examination answer sheets in particular, considerably more accurate.

Still another object of the invention is to disqualify answers, when the invention is employed to grade answer sheets, that are represented by more than one relatively dark area, or if no relatively dark area is present but two or more relatively light areas exist, such as caused by improper erasing, the apparatus herein described will disqualify such responses even though the presence of only one such last-mentioned area would be regarded as an intentionally selected answer or bit of information.

Briefly, the invention involves the photoelectric derivation of a number of analog voltage signals which are representative of the data contained on the sheet. The highest magnitudes or values of these various voltage signals are stored during a predetermined interval derived from marks contained in a timing track. After the timing interval is over, the stored values of the various voltages are converted from their analog values to generally equivalent digital representations which can be forwarded to a computer that has been programmed as far as processing and analyzing the information are concerned.

BRIEF DESCRIPTON OF THE DRAWINGS

FIG. 4 depicts typical waveforms present in the processing of various signals employed in my apparatus.

DESCRIPTION OF THE PREFERRED EMBODIMENT

Figure 1:
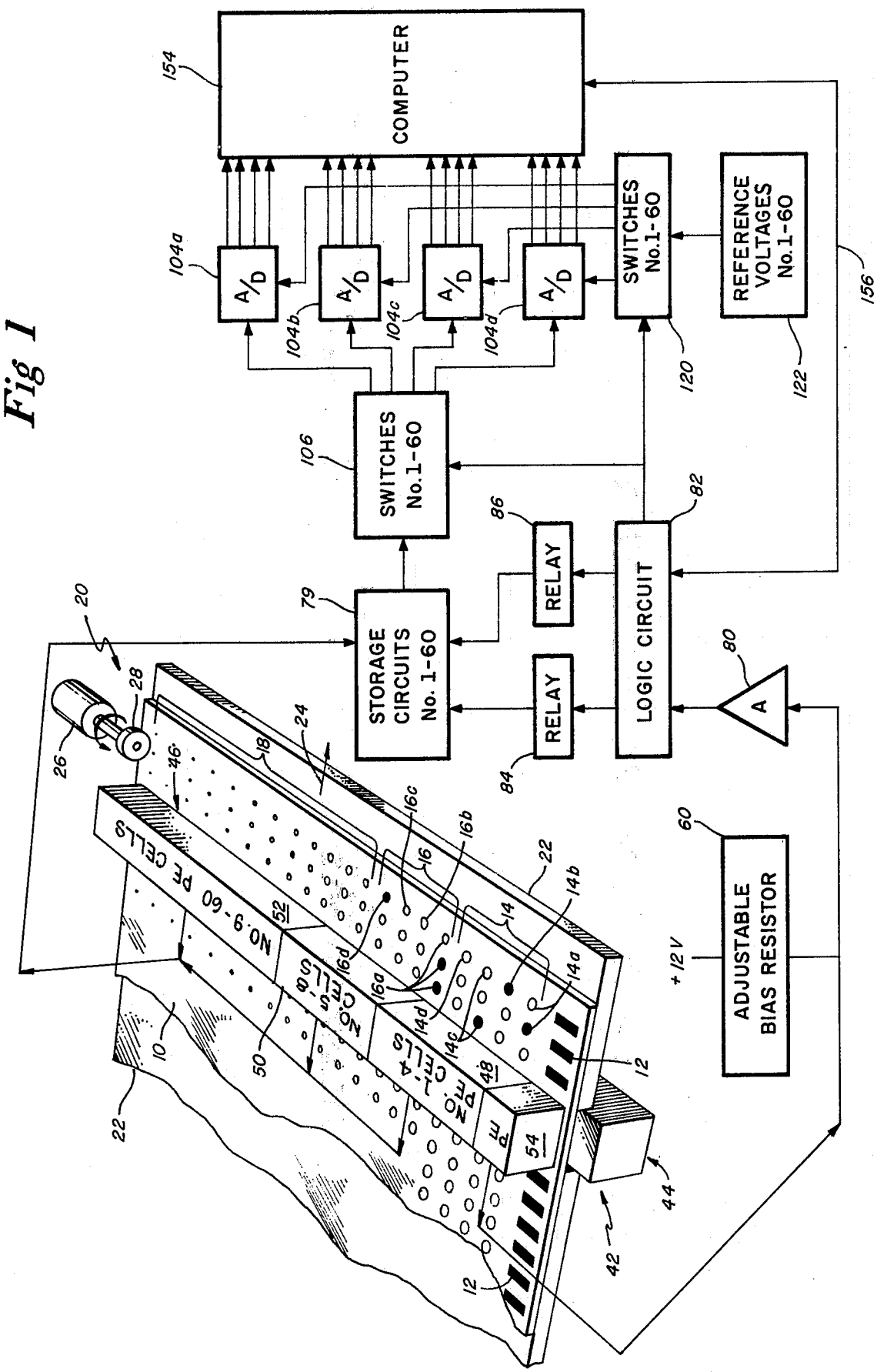
FIG. 1 is a perspective view of a typical answer sheet passing beneath a photoelectric reading head which is connected to a block diagram showing the general arrangement of components used to exemplify my invention.

Referring first to FIG. 1, a typical answer sheet constitutes the document to be read which has been denoted by the reference numeral 10, the answer sheet being of translucent paper. It will be perceived that a series of marks 12 constituting a timing track have been printed along one marginal portion of the sheet 10. Additionally printed on the sheet 10 are various discrete answer areas or bubbles that are arranged in column form for the sake of facile presentation. However, these areas, as far as our invention is concerned, do not have to be oriented in any particular pattern and may be located without regard to relative position.

It will be of help, it is believed, to assign reference characters to certain of these response areas. Consequently, one group of grid of areas has been given the reference numeral 14 with the suffixes $a$, $b$, $c$ and $d$ appended thereto. The number of circuit components to be referred to is not affected by the total number of grid areas, as will become evident. A second group has been given the reference numeral 16 with similar letter suffixes. While any number of response areas can be printed on a given sheet, for the sake of illustration it will be assumed that 60 response areas are abreast of each other on the sheet 10. Consequently, the areas 14 and 16 total only eight, thereby leaving 52 additional response areas which have been grouped and labeled by the single reference numeral 18, thereby permitting the sheet 10 to be shown on a much smaller scale in FIG. 1 than would otherwise be possible. Because of the reduced scale, only the groups 14 and 16 have been shown with marked or filled-in areas, the filled-in areas carrying the specific designations 14$b$ and 16$d$ in the first row, 14$a$ and 16$a$ in the second row, and 14$c$ and 16$a$ in the third row. The group of areas denoted generally by the reference numeral 18 is collectively clustered and residually identified, being impractical due to scale restrictions to designate any of them as containing marked areas. It will be recognized, however, that the examinee will have marked selected areas within the grids of this residual group 18 as well as in the groups 14 and 16.

The illustrated apparatus in FIG. 1, which exemplifies my invention, has been designated generally by the reference numeral 20. From this figure, it will be discerned that the apparatus 20 includes a guide plate or trackway 22. The answer sheet 10 is suitably advanced or fed in the direction of the arrow 24 by means of a motor 26 having a drive roller 28 thereon. It will be appreciated that the motor 26 and its drive roller 28 constitute only a diagrammatic arrangement, maintained simple for illustrative purposes.

As the sheet 10 moves in the direction of the arrow 24, the various areas 12, 14, 16 pass a photoelectric pick-up station labeled 42. The pick-up station 42 is comprised of a lamp block 44 housing a plurality of individual lamps (not shown). The lamps contained in the lamp block 44 provide light energy that is directed upwardly via a number of light conductive cylinders or rods, as is conventional, to the underside of the sheet 10, this being through an opening (or openings) in the plate 22. In practice, the pickup station 42 is underneath and the lamp block 44 on top, but it is believed clearer to reverse the arrangement as far as FIG. 1 is concerned. Further, it will be appreciated that reflected light could be used, the station 42 and block then being on the same side of the sheet 10.

The superimposed pick-up station 42 is further comprised of a reading head 46 which also contains a plurality of light conductive cylinders or rods. It is the upper ends of these rods that lead to a similar number of either conventional photo diodes 48, as schematically denoted in FIG. 2 by the numerals 48$a$, 48$b$, 48$c$ and 48$d$, or photo transistors, the latter being employed in actual practice. The particular type of photo detector is not critical to a practicing of the invention, so they will hereinafter simply be referred to as photoelectric cells or more succinctly as photocells. It will be understood that the photocell 48$a$ senses or picks up the light from the area 14$a$, the cell 48$b$ light from the area 14$b$, the cell 48$c$ from the cell 48$c$, and the cell 48$d$ light from the area 14$d$. Additional groups of photocells 50, 52 are used for sensing the areas 16, 18. Although not specifically shown in FIG. 2, it will be appreciated that a similar photoelectric cell 54 is utilized for sensing the presence of a particular timing mark 12. Inasmuch as the characteristics of the various photocells 48, 50, 52 and 54 are apt to vary with respect to each other, an adjustable bias resistor 56 is shown associated with each cell 48 in FIG. 2 and may, in each case, be set or adjusted to the appropriate resistance value for the particular photocell 48 with which it is associated.

Figure 2:
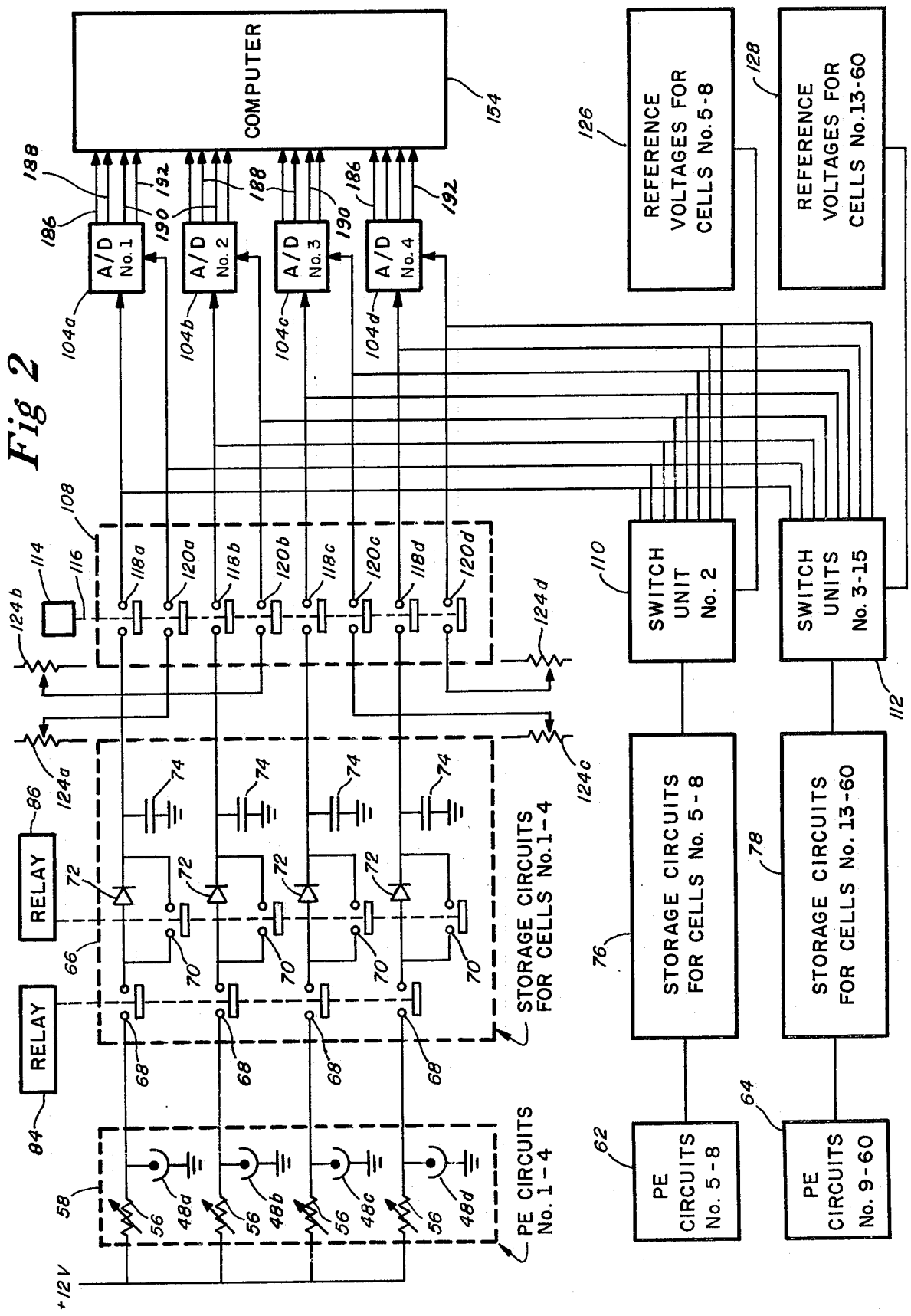
FIG. 2 is a schematic view showing in greater detail some of the components employed in FIG. 1.

At this stage of the description, it will be perhaps well to assign the reference numeral 58 to the various data track photoelectric circuits comprising the cells 48 and resistors 56. The reference numeral 60 denotes an adjustable bias resistor for the timing track photoelectric circuit, the timing track circuit actually comprising the photocell 54 and the adjustable bias resistor 60. The circuit 58 appears schematically in FIG. 2. As can be seen in FIG. 2, the various photoelectric circuits for the photoelectric cells that are arranged above the data areas 14 have been simply placed within a rectangle having the reference numeral 58 applied thereto. The circuitry for the photoelectric cells 50 associated with the reading of the information contained in the areas 16 have collectively been given the reference character 62. The remaining circuits containing the cells 52 which read the information contained in the areas 18 have been given the reference character 64 in FIG. 2. It will be appreciated that the blocks 62, 64 simply denote a multiple duplication of the individual circuits schematically appearing in the dashed block 58 of FIG. 2.

Having presented the foregoing information, it is believed evident that the darker the mark the less light there is passing through the answer sheet 10. Hence, with less light reaching a given photocell 48, 50 or 52, the higher its output voltage therefrom. From FIG. 2, it will be discerned that with a plus 12 volts applied to the various adjustable resistors 56, and a very dark mark at 14b there is almost a 12 volt signal at the anode of the photocell 48b. On the other hand, if there is no mark as in the areas 14a, 14c and 14d, then a substantial amount of light passes through the answer sheet 10 with the consequence that the particular photocells 48a, 48c and 48d involved at this time pass a considerable amount of current, in effect grounding the photocells and thereby causing virtually zero voltage to appear rather than the substantially 12 volts that would appear when a relatively dark mark is passing by.

The various voltages from the photocells 48, 50 and 52 are, quite obviously, in analog form. From what has been presented above, it should be appreciated that the particular voltage is representative of the degree of opacity of the mark, for if there is almost complete darkness, then there is almost a full 12 volts appearing at the anode of the particular photocell 48, 50, 52. When practicing the teachings of the present invention, it is planned that the highest voltage developed as a result of a passing mark be temporarily stored and later converted to a digital signal as will hereinafter be explained.

At this time attention is directed to a block 66 containing a plurality of storage circuits, there being one storage circuit for each photocell 48 contained in the circuitry 58. As can be discerned in FIG. 2, each storage circuit includes a series switch 68 and a parallel switch 70, the parallel switch shunting a diode 72. The actual storage of the voltage signal forwarded from any given photocell 48a, 48b, 48c or 48d is handled by a capacitor 74. Thus, each storage circuit includes a switch 68, a switch 70, a diode 72 and a capacitor 74.

Corresponding to the storage circuits collectively labeled 66 are additional storage circuits contained in a block 76. In this instance the storage circuits 76 are connected to the photoelectric circuits 62. Inasmuch as 60 photoelectric cells 48, 50, 52 have been selected, there still remain 52 additional storage circuits and they have all been identified by a single block 78, serving the 52 photoelectric cells 52 making up the circuits in the block 78. The circuits 66, 76 and 78 have been collectively contained in the rectangle 79 in FIG. 1.

As can be learned from FIG. 1, the photoelectric cell 54 for the timing track 12 is connected to an amplifier 80 which in turn is connected to a logic circuit 82. Hence, when the timing mark voltage, that is the voltage output from the photocell 54, rises to a sufficient value as amplified by the amplifier 80, it is then delivered to the logic circuit 82 which outputs a square wave signal. The square wave signal is used for triggering an electronic switch of the solid state type but shown as an electromechanical relay 84 in this case. The relay 84 closes the various series switches 68. Thus, when the relay 84 is energized by reason of a timing mark causing a sufficient increase in the voltage from the photocell 54 as influenced by the bias resistor 60, this voltage provides a pulse from the logic circuit 82 that is instrumental in closing the various series switches 68 so that any output signal from the various data photocells 48 (or 50, 52) can be impressed across the storage capacitors 74 in the storage circuitry 66. A second relay 86 causes the opening and closing of the parallel switches 70, also being controlled by a signal supplied by the logic circuit 82 but on a somewhat different time basis as will later be better understood.

It will perhaps be helpful at this point to refer to FIG. 4 which graphically presents various waveforms. In this regard, the waveform identified by the reference numeral 90 which appears at the top of FIG. 4 represents a typical raw waveform embodying the voltage from the circuit containing the timing track photocell 54. It is the portion of the waveform 90 that as been specifically given the designation 90a that is used to control the storage time as will presently be made manifest. Actually, it is the portion 90a that is delivered to the amplifier 80 and which via the logic circuit 82 is employed for producing the waveform 92. It is the portion thereof labeled 92a that is used to determine the specific interval during which the storage of the data signals is accomplished. More specifically, the portion 92a spans a period of time of approximately one millisecond.

As far as the waveform which typically represents the voltage output from a data photocell 48, 50 or 52, this waveform has been shown directly beneath the timing track logic waveform 92, having been given the reference numeral 94. The portion thereof which includes a relatively high bump 94a denotes when a mark on the sheet 10 is beneath a particular data photocell 48, 50, 52, say, the darkened area 14 being under the photocell 48b. It is whatever this particular highest voltage happens to be that is stored in the particular capacitor 74 associated with the particular data photocell, such as the cell 46b, that is providing an output voltage at the particular time. Actually, it is the signal represented by the waveform 96 appearing directly beneath the waveform 94 in FIG. 4 that is indicative of the stored voltage on the capacitor 74. It should be remembered that it is the highest voltage value that is stored; it is this voltage value that will later be processed in accordance with the teachings of my invention. It might be explained at this moment, though, that the particular voltage represented by the waveform 96 is stored for an interval after the timing mark has passed on and the voltage represented by the waveform 94 has dropped off to a relatively low value. The portion of the signal represented by the waveform 96 that is used to charge a capacitor 74 during a timing period provided by a pulse 92a has been given the reference designation 96a and the portion retained after the timing period distinguished by the reference character 96b. The reason for maintaining the stored value of the various photoelectric cell voltages will presently be made clearer.

It will also be appreciated that the various parallel switches 70 shown in the block 66 are all open during the time that the output voltage from the several photoelectric cells 48 are being stored. However, after the storage period represented by the portion 92a of the waveform 92 has ended, there follows what will be termed a process period which has been denoted by the waveform 98, more specifically its portion 98a. Although not entirely comprehensible at this stage, it can be pointed out that there is a period where the stored values of the various analog signals are processed, this being during the wave portion 98a.

It will be helpful to label the waveform showing when the series switches 68 are closed and this has been done also in FIG. 4, the waveform having been given the reference numeral 100 and the portion of the waveform when the series switches are closed the reference character 100a. Thus, the relay 84 is energized during the wave portion 100a. Similarly, the waveform for the parallel switches 70 has been labeled 102 and includes a portion 102a of the waveform 102 that the capacitors 74 are following exactly what is delivered thereto from the various photocells 48. It is only when the parallel switches 70 are open that the diodes 72 are effective to prevent any discharging of the various capacitors 74. This is during the wave portion 102a. Stated somewhat differently, it is when the parallel switches 70 are closed that the diodes 72 are by-passed and the capacitors 74 can then follow the various photocells 48. As soon as the next timing mark comes along, then the parallel switches 70 are all opened, leaving the series switches 68 closed, however. The storing process as far as the highest voltage value is concerned is then restarted and the highest value again stored.

Before the above is repeated, however, the processing of all of the stored signals is undertaken; this means all the signals stored in the storage circuits 66, 76 and 78 are processed. Although there are 60 data cells 48, 50, 52 in the exemplary situation, there are only four analog-to-digital converters 104, being denoted as 104a, 104b, 104c and 104d. Briefly, the function of the A/D converters 104 is to change the stored analog voltage signals into digital signals, specifically the signal graphically represented by the particular portion 96b (plus 59 other corresponding portions). It is important to note that only a few A/D converters are used (namely, four), a multiplexing action permitting the analog values to be processed in group sequences.

The multiplexing is also achieved in actual practice by reason of certain solid state electronic switches. However, the operation of my apparatus is more easily understood by showing, at least to some extent, electromechanical switch units, as has been done with the relays 84, 86 and the switches 68, 70 depicted in conjunction therewith. These switch units have been collectively identified as the switch assemblies denoted by the reference numerals 106 and 120 in FIG. 1, receiving energizing signals from the logic circuit 82. As far as FIG. 2 is concerned, it will be observed that one switch unit 108 has been schematically presented. A similar switch unit appears in FIG. 2 and has been given the reference numeral 110. On the other hand, additional switch units, being 13 is number, have been assigned the reference numeral 112. It should be noted that switch assembly 108 consists of four switches from each switch assembly 106 and 120 in FIG. 1. This also similarly applies to switch units 110 and 112.

Describing the switch unit 108 of FIG. 2, it will be observed that it is also shown in the form of an electromagnetic relay, although solid state in practice, having a coil 114, an armature 116 and a number of normally open switches. It has four sets of normally open switches 118 identified as 118a, 118b, 118c and 118d that are serially arranged with the storage circuits 68, 70, 72, 74 contained in the block 66 and the various A/D converters 104. There are additionally normally open switches 120 (shown as a block in FIG. 1) labeled 120a, 120b, 120c and 120d (in FIG. 2) which are also connected to the A/D converters 104, being instrumental in applying reference voltages from the reference voltage supply 122 (FIG. 1). The reference voltage supply 122 of FIG. 1 includes four potentiometers 124a, 124b, 124c and 124d set forth in FIG. 2. Each voltage reference potentiometer 124 is logically paired to the capacitor storage circuit for each photocell; overall there are 60 of each in the supply 122 (broken down to the four labeled 124 in FIG. 2, four more in block 126 and the remaining 52 in block 128).

Recapitulating for a moment, it will be appreciated that the logic circuit 82 exercises supervisory control over the switch assembly 106 (composed of units 108, 110, 112) and the switches 120. Actually, in the illustrative situation of FIG. 2, the logic circuit 82, at the proper time, furnishes an energizing signal causing the various switches 118 and 120 to close.

It will be helpful to understand that the waveform 96 in FIG. 4, this being the waveform that represents a typical voltage that is stored on a given capacitor 74, has a 0.5 millisecond portion carrying the reference designation 96b which constitutes the time period during which groups of eight switches (all eight in block 108 followed by all eight in block 110 followed by groups of eight in block 112) and are all closed by virtue of the control action provided by the logic circuit 82. This is called the process time and the waveform labeled 98 in FIG. 4 depicts a portion 98a which is the portion during which the various switch units 108, 110, 112 are energized to forward the stored analog voltage signals from the various capacitor to the A/D converters 104. At the same time, the switch units 108, 110 and 112 are also forwarding reference voltages from the potentiometers 124a, 124b, 124c, 124d of FIG. 2, and the potentiometers contained in the blocks 126 and 128, to the A/D converters 104.

The logic circuit 82 does the above in steps, as should be evident, first energizing the switch unit 108 so as to forward the stored voltage signals initially derived from the photoelectric circuits 48, 56 in the block 58 and held in capacitors 74 of the storage circuits in the block 66 to the four A/D converters 104a, 104b, 104c and 104d. At the same time, the voltage reference potentiometers 124 are switched to the A/D converters 104. It is after this has occurred that the switch unit 110 is energized so as to forward the signals obtained via the photoelectric circuits 62 and the storage circuits 76 associated therewith along with the reference voltages from the supply 126, to the same A/D converters 104a, 104b, 104c, 104d. Still additional timing is performed in the logic circuit 82 which connects the storage circuits 78 and the reference voltages from the supply 128 to the A/D converters after the switches 108 and 110 have been closed and reopened. It will again be explained that the potentiometers 124 and the two supplies 126, 128 collectively constitute the general supply 122 of FIG. 1. The foregoing provides a multiplexing action which is graphically portrayed by the additional waveforms 124–152, each having a switching pulse 124a–152a which achieves the foregoing sequencing.

Considering now the function performed by the computer, which has been given the reference numeral 154, it will be appreciated that the multiplexing action referred to above involves utilizing the signals obtained from the first four data cells 48a, 48b, 48c, 48d by way of the storage circuitry 66 associated therewith. What happens first is that switch unit 108 is activated by control logic 82 which closes the switches. This allows the voltage values from storage unit 66 and the reference voltages 124 to be connected to the A/D converters 104. What occurs in the A/D converter system involving the converters 104 is that the first four signals are converted into digital values of four bits each. Assuming that the computer 154 is a 16 bit computer, a 16 bit data word is sent to the computer. When the computer 154 sends back a signal over the group of lines collectively identified by the numeral 156 saying that the 16 bit word has been received, then the logic circuit 82 switches the switch unit 108 off and disconnects the storage circuits 66 associated with the photocells 48 to the converters 104. The next switch unit 110 is then switched in and cells No. 5 through No. 8 are converted to 4 bit values and sent to the computer. This is repeated right on down the line, as evidenced by the sequential pulses 124a–152a, until all 60 photocells have been processed. Inasmuch as there are four converters 104a, 104b, 104c, 104d, the process, remembering that there are 60 data cells 48, 50, 52, must be repeated 15 times; hence, 15 pulses 124a–152a. As already mentioned, the switches 108, 110 and 112 are solid state switches which are readily operated by the logic circuit 82 as controlled by the computer 154. However, the showing of the switch 108 in FIG. 2 as an electromechanical switch, as previously mentioned, is believed to facilitate an understanding of the invention.

Perhaps presenting the situation in a slightly different fashion will also help in comprehending what takes place. We have already referred to 60 data cells 48, 50, 52. Therefore, it will be appreciated that the first, fifth, ninth, thirteenth, seventeenth, etc. are all serviced by the A/D converter 104a whereas the second, sixth, tenth, fourteenth, eighteenth, etc. are serviced by the A/D converter 104b, the third, seventh, eleventh, fifteenth, nineteenth, etc. cells by the A/D converter 104c, and finally the remaining cells by the A/D converter 104d. The switches 118 and 120 of the unit 108 for the first four cells 48a, 48b, 48c, 48d are opened up as soon as the processing is completed for these four cells, and then the switch unit 110 for the cells 50 is closed and the stored signals for these four cells are processed. The procedure continues for the remaining cells 52, doing so four at a time.

It can be explained at this point that the potentiometers 122a, 122b, 122c, 122d associated with the switch unit 108 in FIG. 2 are each adjusted by hand in order to supply the correct reference voltages. These reference voltages are used to operate the four A/D converters 104. It is because there is a difference in the characteristics of the various photocells 48a, 48b, 48c, 48d (as well as between the cells 50, 52), differing from one to another, that it becomes necessary to resort to the application of these reference voltages. In this way, the value derived from one darkened area is made to mean the same thing when sensed by one photocell as compared with the information or data sensed by another photocell as determined by another darkened area.

Summarizing, it will be recognized that the particular A/D converter 104a has 15 photocells associated with it and that it receives the stored voltages from the various capacitors 74 coming through the individual switch 118a (and 14 additional such switches in switch units 110, 112). Similarly, the A/D converter 104b receives the analog voltages from a different set of 15 cells, doing so through the switches 118b (only the one for unit 108 being depicted) of the various switch units 108, 110 and 112 in circuit with 15 different capacitors. The third A/D converter 104c does the same thing for 15 other cells and 15 other capacitors. Still further, the remaining A/D converter 104d does the same thing for the remaining 15 cells and capacitors.

It will be of help, it is thought, to again refer to the graphical sequence that has been described. Accordingly, FIG. 4 illustrates the 15 waveforms denoted by the reference numerals 124–152 where pulses 124a–152a are provided in the proper time sequence from the logic circuit 82 which simply makes it such that the various converters 104 receive stored signals only in groups of four and that the groups of signals are sequentially delivered. The same delivery of signals from the various capacitors in groups of four is also tied to the application of reference signals from the supply 122. FIG. 1, it is believed, adequately demonstrates that the logic circuit 82 controls the switches 68 (through relay 84), switches 70 (through relay 86), and switches 106 (108, 110, 112), thereby forwarding data signals and also applying the proper reference voltages.

Figure 3:
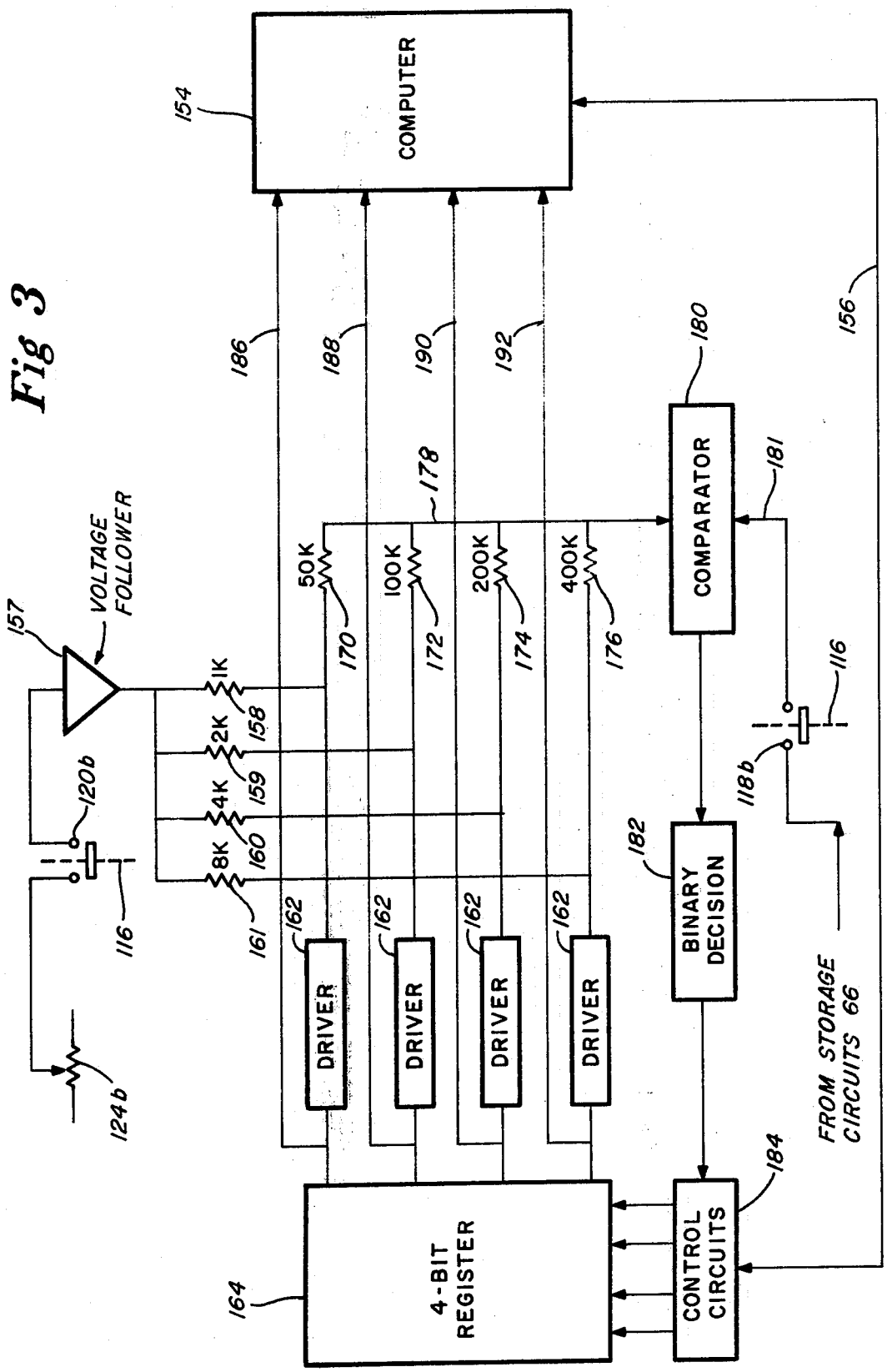
FIG. 3 is a schematic view portraying one of the analog-to-digital converters shown only generally in FIGS. 1 and 2.

The system of analog-to-digital conversion that is utilized when practicing my invention is best understood from FIG. 3. In this figure, the analog-to-digital converter is the one labeled 104b in FIG. 2 in that area 14b has been arbitrarily considered to be a marked or darkened one. To aid in correlating the two views, the particular potentiometer 124b has been included plus the specific switch 120b contained in the switch unit 108. It will be observed that the contacts of the switch 120b are connected to the input of a voltage follower 157. The output of the voltage follower 157 follows its input; however, the follower outputs enough current to supply four binary weighted resistors 158, 159, 160 and 161. More specifically, the resistors 158 is a 1K one, the resistor 159 a 2K one, the resistor 160 a 4K one, and the resistor 161 an 8K resistor. The other ends of the resistors 158-161 are connected to four open collector drivers 162 which are driven by a four-bit register 164. Also in the circuit are the resistors 170, 172, 174 and 176, these resistors, as with the above-mentioned resistors 158, 159, 160 and 161, having weighted values in accordance with the binary output to be derived from the binary register 164. More specifically, the resistor 170 is a 50K one and represents the lowest order or binary bit $2^0$, whereas the resistor 172 is a 100K one and represents the next higher order or binary bit $2^1$, whereas the resistor 174 is a 200K one and represents the next higher order or binary bit of $2^2$, the remaining resistor 176 being a 400K one and therefore representative of the highest order or binary bit value $2^3$. The resistors 170, 172, 174 and 176 constitute a binary weighted network. The other end of the resistors 170, 172, 174, 176 are joined together and the line connecting them has been identified by the reference numeral 178. This line 178 extends to one input of a comparator 180, whereas the analog voltage delivered from one capacitor 74 via the switch 118b over a line 181 is applied to the other input thereof. Any difference between the input signals delivered to the comparator 180 appears as an output signal that is fed to a binary decision circuit 182 which in turn is connected to the control circuit 184 for the counter 160. The four lines 186, 188, 190 and 192 which are connected to the 4-bit register, extend to the computer 154 and simply deliver the digital output signals from the register 164 to the computer 154 for storage therein and computes analysis as to whether they represent a 4-bit digital value indicative of a correctly marked answer.

The basic method for determining the digital value of the analog voltage by the A/D converters 104 is called "successive approximation". In the carrying out of this method, the uppermost bit on the four bit register 164 is set to effect the start of the count. The output from the binary weighted network which appears on the line 178 will then be one-half of whatever the reference voltage supplied by the potentiometer 124 for the cell happens to be adjusted for. This is checked against the analog voltage on the line 181 derived from the photocell 48b, which has picked up a relatively large voltage signal due to the darkened area 14b, the highest value of which having been stored by one of the capacitors 74. Whatever the resulting voltage is on line 178 is checked as to whether it is either higher or lower than the voltage originally derived from the particular photocell 48b on line 181. If the analog voltage on line 181 is less than half the value of the reference voltage supplied by the potentiometer 122b, then it simply means that the binary value "8" is too great. Therefore, the uppermost bit is cleared within register 164 and the next lower order bit is set. What occurs is that there is a jumping down from the count of "8" to the count of "4". The binary weighted network also jumps down to one-half of its previous value which is one-fourth of the reference voltage supplied by the potentiometer 122b. This is again checked against the capacitor voltage supplied by line 181. If the capacitor or stored voltage is higher, then that bit will be left and the register 164 set for the next lower bit. It is then checked to see whether the voltage appearing on the line 178 is either higher or lower than that delivered on the line 181.

The control circuit 184 simply causes the several flip-flops contained in the register 164 to be switched so that successive comparisons (four comparisons being made in total) of the incoming voltage on the line 181 derived from the photocell 48b is compared with a set of voltages of known values. As the conclusion of the conversion operation, the result is that a digital representation corresponding to analog voltage supplied via the line 181 remains stored in the register 164. At this time, the digital value or signal can be transferred from the register 164 to the computer 154. It is important to appreciate that the analog signal has been changed to a digital value that closely represents the specific magnitude of the photocell voltage which was stored.

It should be kept in mind that while the particular converter 104b appearing in FIG. 3 is working, the other converters 104a, 104c and 104d are doing exactly the same thing, these other three converters processing signals derived from the three other photocells 48a, 48c and 48d. As soon as the processing of stored signals from the four photocells 48a, 48b, 48c and 48d has been completed, the resulting digital values from all four A/D converters 104a, 104b, 104c, 104d are delivered to the computer 154 via the parallel lines 186, 188, 190 and 192 for each converter 104, this simply being done by a program signal that enables the computer to accept these digital signals.

The process is then repeated with the stored signals obtained from the next four photocells 50, the analog signals from each being converted to a corresponding digital signal, and then after the conversion process fed to the computer 154, the switching in of the stored signals from the next four cells being achieved, and so on until this has been done 15 times in the illustrative case (because 60 cells have been selected and analog signals from four cells can be converted at any given moment in that four converters 104 are employed). It will be appreciated, though, that as far as the process time is concerned, this being within an interval of 0.5 millisecond, it is done after a particular timing mark 12 has passed from beneath the photoelectric cell 54 that senses or picks up light from the timing track. The various capacitors 74 simply store the signals, holding the values until all 60 photoelectric cells have been processed.

When the 60 cells have all been processed, then the series and parallel switches 68, 70 are both closed again by signals supplied to the relays 84, 86. This enables each capacitor 74 to follow exactly what it receives in the way of a voltage output from the particular photocell circuit 48, 56 with which it is associated. Until another timing mark 12 comes along, the diodes 70 in the various storage circuits 66, 76, 78 are not in the circuit, being bypassed or shunted by reason of the parallel switches 70. When the next timing track mark 12 comes along, it causes the parallel switches 70 to be opened, this being done through the logic circuit 82 and relay 86, and then the storing portion of the cycle determined by the pulse 92a is repeated, this now being in conjunction with a subsequent set of data information. In other words, the 60 discrete marking areas that have provided the signals which have been stored and digitally converted during the processing time that has been consummated have progressed beyond the head 46 in the direction of the arrow 24, thereby bringing into juxtaposition a second field of 60 discrete areas, some of them having been marked to denote selected answers by the examinee.

Owing to the digital conversion that has taken place after the entire answer sheet 10 has been optically scrutinized, it will be recognized that digital signals of any order of magnitude can be accepted by the computer 154. Consequently, if all signals below a given voltage value are to be discarded, a parameter need only be introduced into the computer 154 which causes it to refuse to accept digital values corresponding to the particular analog values that must be met. This can be done as far as either light or dark marks are concerned. In other words, there is no external adjustment that need be made in order to enable the computer to accept, or reject, certain signals which are to be taken into account, or which are to be ignored, as the case may be, in the grading process. With the digital signals so stored in the computer's memory, it is then that the computer, by properly programming it, can determine the score or grade for the particular examinee whose sheet 10 has been optically scanned and electronically processed.

We claim:

1. Apparatus for scoring an answer sheet having discrete response areas thereon, the darkening of a particular area within a group of areas denoting the answer to a question selected by an examinee, a plurality of fixedly located photoelectric cells, means for feeding the answer sheet relative to said photoelectric cells, said photoelectric cells providing individual analog voltage signals representative of the degree of opacity for the particular areas positioned in juxtaposition to said photoelectric cells so that said areas are sensed by said photoelectric cells, respective means for storing the maximum value of each voltage signal reached during a certain period as said areas move relative to said photoelectric cells, means for converting said stored analog voltage signals to digital signals including a lesser number of analog-to-digital converters than the number of photoelectric cells, the number of said storage means corresponding to the number of photocells, and means for successively connecting said converters to one group of said storage means corresponding in number to the number of converters and then to a second group of said storage means corresponding in number to the number of converters, and means for processing said digital signals to ascertain the correctness or error of a particular answer.

2. Apparatus for photoelectrically reading an answer sheet having a group of discrete areas and at least one timing mark thereon, the darkening of a particular area denoting certain information or data by reason of the resulting mark, the apparatus comprising photoelectric means, means for relatively moving the answer sheet with respect to said photoelectric means to effect said photoelectric reading, said photoelectric means providing an analog voltage signal having a magnitude in accordance with the capacity of the mark when said sheet is in a position to be read by said photoelectric means, means for converting said analog signal into a digital signal having a value generally representative of the magnitude of said analog voltage signal, means for storing said analog voltage signal, first switch means for connecting said storing means to said converting means when a stored analog voltage signal is to be converted, second switch means for connecting said photoelectric means to said storage means during a particular time interval, said additional photoelectric means responsive to said timing mark for causing said second switch means to close and thereby connect said first photoelectric means to said storing means during said time interval, said storing means including a capcitor, a diode connected between said second switch means and said capacitor and third switch means in parallel with said diode, said third switch means being closed to by-pass said diode when no timing mark is present.

3. The apparatus of claim 2 including a logic circuit connected to said additional photoelectric means, said logic circuit controlling said second and third switch means.

4. The apparatus of claim 3 in which said converting means includes a plurality of analog-to-digital converters, said photoelectric means including a plurality of photoelectric circuits, said storage means including a plurality of storage circuits each having a capacitor therein, and said second switch means sequentially connects a group of said storage circuits to the inputs of said plurality of analog-to-digital converters.

5. The apparatus of claim 4 including means for supplying a plurality of reference voltages having values for compensating for differences between the photoelectric cells contained in said plurality of photoelectric circuits, and fourth switch means controlled by said logic circuit for connecting said supplying means to said analog-to-digital converter to connect the appropriate reference voltages to said analog-to-digital converters when said second switch means connects said plurality of converters to said storage means.

6. The apparatus of claim 5 including a computer connected to the output of said converters.

7. The apparatus of claim 6 in which each converter includes a binary register and a binary weighted network.

8. The apparatus of claim 7 in which each converter includes a comparator having one input connected to said binary weighted network and a second input connected to said second switch means.

9. The apparatus of claim 8 in which each converter additionally includes a binary decision circuit connected to the output of said comparator and control circuitry connected between said binary decision circuit and said register.

10. Apparatus for optically reading information from an answer sheet containing timing marks and various discrete answer areas thereon, the apparatus comprising means for moving said answer sheet, a reading head including a first photoelectric cell disposed with respect to said moving means for sensing the passage of a timing mark and a plurality of additional photoelectric cells disposed relative to said moving means for sensing the passage of answer areas to provide analog voltages having magnitudes in accordance with the opacity of the answer areas sensed thereby, a logic circuit, means connected to said first photoelectric cell for producing a pulse in response to the passage of a timing mark relative to said first photoelectric cell, a storage circuit connected to each of said additional photoelectric cells for storing the highest voltage sensed by the particular photoelectric cell to which it is connected during the period of said pulse, a lesser number of analog-to-digital converters than the number of said additional photoelectric cells, and the number of storage circuits connected thereto, each being capable of providing a digital signal at its output representative of the magnitude of the analog voltage signal applied to its input, switch means for connecting successive groups of said storage circuits to the inputs of said analog-to-digital converters so that digital signals are derived at the outputs of said converters having values corresponding generally to the magnitudes of said stored voltage signals, and means connected to the outputs of said analog-to-digital converters for storing said successively derived digital signals.

11. The apparatus of claim 10 in which said last-mentioned means constitutes a programmed computer.

12. The apparatus of claim 11 including means for supplying reference voltages to said analog-to-digital converters.

13. The apparatus of claim 12 in which said reference voltages are supplied to said converters via additional switch means.

14. The apparatus of claim 13 in which both of said switch means are controlled by said logic circuit.

* * * * *